US00RE41541E

(19) United States
(12) Reissued Patent
Soini et al.

(10) Patent Number: US RE41,541 E
(45) **Date of Reissued Patent: *Aug. 17, 2010**

(54) MULTI-SERVICE MOBILE STATION

(75) Inventors: Veli-Matti Soini, Toijala (FI); Markku Rautiola, Tampere (FI); Jarmo J. Makela, Tampere (FI); Toni Sormunen, Saaksjarvi (FI); Harri Halminen, Kangasala (FI); Jari Toivanen, Tampere (FI)

(73) Assignee: Nokia Corporation, Espoo (FI)

( * ) Notice: This patent is subject to a terminal disclaimer.

(21) Appl. No.: 11/134,470

(22) Filed: May 20, 2005

Related U.S. Patent Documents

Reissue of:
(64) Patent No.: 6,611,693
Issued: Aug. 26, 2003
Appl. No.: 10/211,116
Filed: Aug. 1, 2002

U.S. Applications:

(62) Division of application No. 08/802,715, filed on Feb. 19, 1997, now Pat. No. 6,445,932.

(30) Foreign Application Priority Data

Feb. 23, 1996 (FI) ..... 960859

(51) Int. Cl.
*H04M 1/00* (2006.01)
H04M 1/725; H04M 1/72; H04M 1/73; H04Q 7/32

(52) U.S. Cl. ..... 455/556.1; 455/566; 455/567; 455/575.1

(58) Field of Classification Search ..... 455/556.1, 455/556.2, 566, 575.1, 575.3
See application file for complete search history.

(56) References Cited

U.S. PATENT DOCUMENTS

| | | | | |
|---|---|---|---|---|
| 5,020,090 | A | 5/1991 | Morris | 379/58 |
| 5,049,862 | A | 9/1991 | Dao et al. | 340/706 |
| 5,128,981 | A | 7/1992 | Tsukamoto et al. | 379/58 |

(Continued)

FOREIGN PATENT DOCUMENTS

DE 4108169 A1 9/1991

(Continued)

OTHER PUBLICATIONS

IBM Technical Disclosure Bulletin, "Personal Communicator Configurations", Jun. 1994, 3 pages.
JP 8237138–A English language abstract, Kokusai Denki KK, 2 pages, 1996.

*Primary Examiner*—Lee Nguyen
(74) *Attorney, Agent, or Firm*—Harrington & Smith

(57) ABSTRACT

A multi-service mobile station according to the invention comprises means (42) for connecting the device by radio to telecommunication network in order to utilize typical mobile station services, such as speech and data services. Additionally, the multi-service mobile station provides means (41, 40, 47) for using various information processing services (P1, P2), such as telefax service and electronic mail service. When using information processing services, the information processed by the user is automatically saved in the memory means (40, 47) of the multi-service mobile station when a certain criterium is met. The criteria are e.g. shifting from one service to another, going over to current saving mode, or, in a two-section multi-service terminal device, folding the device together. It is also characteristic of the multi-service mobile station according to the invention, that the automatic data storing and current saving methods operate in a close-knit cooperation with operating system, resulting in the longest possible battery operating time for the multi-service mobile station.

29 Claims, 3 Drawing Sheets

U.S. PATENT DOCUMENTS

| | | | | | |
|---|---|---|---|---|---|
| 5,189,632 | A | * | 2/1993 | Paajanen et al. | 708/109 |
| 5,241,284 | A | | 8/1993 | Nyqvist et al. | 330/297 |
| 5,257,257 | A | | 10/1993 | Chen et al. | 370/18 |
| 5,291,542 | A | | 3/1994 | Kivari et al. | 379/58 |
| 5,303,291 | A | | 4/1994 | Takagi et al. | 379/433 |
| 5,324,925 | A | | 6/1994 | Koenck et al. | 235/472 |
| 5,335,276 | A | | 8/1994 | Thompson et al. | 380/21 |
| 5,337,346 | A | | 8/1994 | Uchikura | 379/58 |
| 5,375,230 | A | | 12/1994 | Fujimori | 395/575 |
| 5,378,935 | A | | 1/1995 | Korhonen et al. | 327/114 |
| 5,414,444 | A | | 5/1995 | Britz | 345/186 |
| 5,416,435 | A | | 5/1995 | Jokinen et al. | 327/113 |
| 5,422,656 | A | | 6/1995 | Allard et al. | 345/173 |
| 5,467,102 | A | | 11/1995 | Kuno et al. | 345/1 |
| 5,471,655 | A | | 11/1995 | Kivari | 455/127 |
| 5,491,718 | A | | 2/1996 | Gould et al. | 375/205 |
| 5,517,552 | A | | 5/1996 | Yamashita | 379/58 |
| 5,570,369 | A | | 10/1996 | Jokinen | 370/95.3 |
| 5,581,244 | A | | 12/1996 | Jokimies et al. | 340/825.44 |
| 5,584,054 | A | | 12/1996 | Tyneski et al. | 455/89 |
| 5,615,384 | A | | 3/1997 | Allard et al. | 395/800 |
| 5,797,089 | A | * | 8/1998 | Nguyen | 455/403 |
| 5,854,997 | A | | 12/1998 | Sukeda et al. | 704/3 |
| 6,047,196 | A | | 4/2000 | Makela et al. | 455/556 |
| 6,259,932 | B1 | | 7/2001 | Constien | 455/556 |
| 6,445,932 | B1 | * | 9/2002 | Soini et al. | 455/556 |

FOREIGN PATENT DOCUMENTS

| | | | |
|---|---|---|---|
| DE | 4017690 | A1 | 12/1991 |
| EP | 0472361 | A2 | 2/1992 |
| EP | 0651544 | A2 | 5/1995 |
| EP | 0678987 | A1 | 10/1995 |
| EP | 0704788 | A2 | 4/1996 |
| FR | 2669131 | | 5/1992 |
| GB | 2291560 | A | 1/1996 |
| JP | 06030083 | A | 2/1994 |
| JP | 6-30093 | | 4/1994 |
| JP | H6-152459 | | 5/1994 |
| JP | 6-164440 | | 6/1994 |
| WO | WO-93/23933 | A1 | 11/1993 |

* cited by examiner

MULTI-SERVICE MOBILE STATION

Matter enclosed in heavy brackets [ ] appears in the original patent but forms no part of this reissue specification; matter printed in italics indicates the additions made by reissue.

This is a division of application Ser. No. 08/802,715 filed Feb. 19, 1997 now U.S. Pat. No. 6,445,932.

FIELD OF THE INVENTION

The present invention is a multi-service mobile station, the data storing and power saving properties of which are optimized and which is connected to a mobile communication network by radio. In addition to the normal mobile station functions, such as speech and data services, said multi-service mobile station is suitable for a versatile data communication terminal. Said multi-service mobile station offers e.g. telefax (facsmile), calendar and notebook services and makes it possible to have a radio connection to other data communication networks, for example to Internet, for utilization of various services.

BACKGROUND OF THE INVENTION

In the modern information society people are more and more dependent on telecommunication networks and services offered by them. Utilizing telecommunication networks has been experienced to be so important that people no more want to be dependent on the bonds of traditional wired network. This is why a great number of people already have wireless mobile stations, e.g. GSM stations, which are mainly used for normal speech communication.

To a more increasing extent people have become dependent on even other telecommunication services available, such as telefax, electronic mail, Internet and other information transfer services. When one is used to these services in the traditional office environment, they are difficult to give up for example when leaving for a business trip.

In order to manage when on the road, as easily as possible, e.g. one's time and meetings, so called electronic notebooks have been developed. They are generally called PDA (Personal Digital Assistant), PCD (Personal Communication Device) and PIC (Personal Intelligent Communicator) devices. These devices are typically of the size of a largish pocket calculator and often equipped with a touch screen. The user can with a plastic tip pencil designed for this particular purpose, or even by touching the screen with fingers, write text and figures on the screen, from which the device interprets the information given. In addition to that, the user can control the functions of the device by touching menus which the device generates in the display. Typical services made possible by PDA devices are e.g. calendar and notebook services, reminding of agreed meetings by e.g. an acoustic signal, and a phone book from which information can be searched based upon a person's or company's name or other corresponding information. Additionally, PDA devices often also have a pocket calculator function.

When the features of a mobile station, a computer and a typical PDA device are integrated and packed in a very compact size, the result is a very versatile wireless data communication terminal. An example of a device comprising a touch screen known from PDA devices, DOS operating system known from computers, and a traditional mobile station, is presented in U.S. Pat. No. 5,422,656. With the device according to said patent publication it is possible to use various telecommunication services, e.g. to use it as a normal mobile telephone, to transmit and receive telefax messages or to use it as a pocket calculator.

The solutions presented in said US patent yet have their disadvantages. Because the device is based on DOS operating system known from computers, the device must be at commissioning be initialized by loading the operating system in the processor of the device. After this, the first service, e.g. mobile telephone service, is loaded in a memory. When the mobile telephone service is initialized, it further initializes the necessary auxiliary components, and contacts a base station. All these initializing operations are time consuming and it takes quite a long time until the device is prepared for wireless communication after switch-on.

When shifting from one service to another, e.g. from said telefax service to said phone service, the user must first save the eventual information used by him in the previous service in order not to loose it when starting a new service. This is laborious and can easily be forgotten in a hurry. This will happen e.g. when the user is writing a telefax message and answers an incoming call too hurriedly. Alike when initializing the device for the first time, also all new services must be separately loaded in the memory of the device before they can be used. This downgrades the usability of services and does not offer a handy method for transferring information from one service to another. Neither does the operating system used make it possible to use several services simultaneously.

A very big disadvantage is also, that information which has not been stored, is lost when battery voltage drops too low, or if for some other reason power supply is cut off or disturbed. This happens e.g. if the battery gets loose or if there is poor contact in battery terminals.

Now a multi-service mobile station has been invented, with which at least part of the above mentioned problems can be avoided.

SUMMARY OF THE INVENTION

The multi-service mobile station according to the invention is always automatically ready for use when a sufficiently charged battery is connected. To enable this without reducing the operating time when battery powered, the multi-service mobile station is preferably provided with an advanced power saving automation. Moving from one service to another is executed either by selecting the required service using specific service keys or by touching the part of a touch screen which indicates the required service. When the user moves from one service to another, the information belonging to the previous service is stored automatically. This is the case e.g. when the user is using some service other than speech service at the moment when an incoming call is connected and preferably no information is lost even if the user moves directly to speech service.

Storing of information is carried out in such a way, that when the user selects a new service, the processor of the multi-service mobile station stores the user input and the status data connected with the previous service in the memory of the multi-service mobile station as a response to leaving a service. When the user for the next time returns to the same service, the processor of the multi-service mobile station retrieves, based upon said status data stored in the memory, the previous user situation of said service and presents it in the display of the multi-service mobile station. In this way the user can continue utilizing the service preferably directly from the situation, in which the service was when last used by the user.

Because the multi-service mobile station automatically stores the information processed by it, it is possible to set the multi-service mobile station in automatic answering mode, in which mode speech service or respectively telefax service is automatically activated upon an incoming message. Using other services during speech service is also possible.

The advanced automatic data storing and power saving methods take care of the storing of information also in case of disturbances in power supply. If the state of battery charge goes down too much, or if e.g. the battery is disconnected from the multi-service mobile station, the information on all services and the processed information are stored automatically. All processed information is usable again when the power supply returns to normal.

The utilization of the services of the multi-service mobile station according to the invention is not limited only to services known from PDA devices and mobile stations, but it can also be equipped with an infrared transmitter-receiver, which enables-utilizing, the multi-service mobile station e.g. for transferring information between the multi-service mobile station and an external device, e.g. a personal computer, as a wireless pay terminal in shops, as a remote control device or as a key in security applications.

It is characteristic of the invention, that the multi-service mobile station comprises information storing means for automatically storing information related to the service in use, when a predetermined criterium is met.

There are several embodiments, different in their mechanical approach, for the multi-service mobile station according to the invention which utilizes automatic data storing methods and power saving methods. By enhancing the display and keyboard of a traditional mobile station it is possible to create a user interface large enough to provide the required services. This is the case in particular if the display of the multi-service mobile station is provided with a touch sensitive surface enabling using the display for receiving alphanumeric and graphic information. The above described solution is applicable if the volume of information to be processed by the multi-service mobile station is not very large, because the small size of the display and/or keyboard set their own limitations.

The multi-service mobile station according to the invention is described in detail in the following using one preferable embodiment, the mechanical solutions of which are different from traditional mobile stations. There are though no limitations to the utilization of the automatic data storing methods and power saving methods according to the invention in devices, the mechanical construction of which has a greater resemblance with traditional mobile stations. Said preferable embodiment enables the use of e.g. a larger display and a larger keyboard without an increase in the multi-service mobile station's main dimensions.

DETAILED DESCRIPTION

Figure 1:
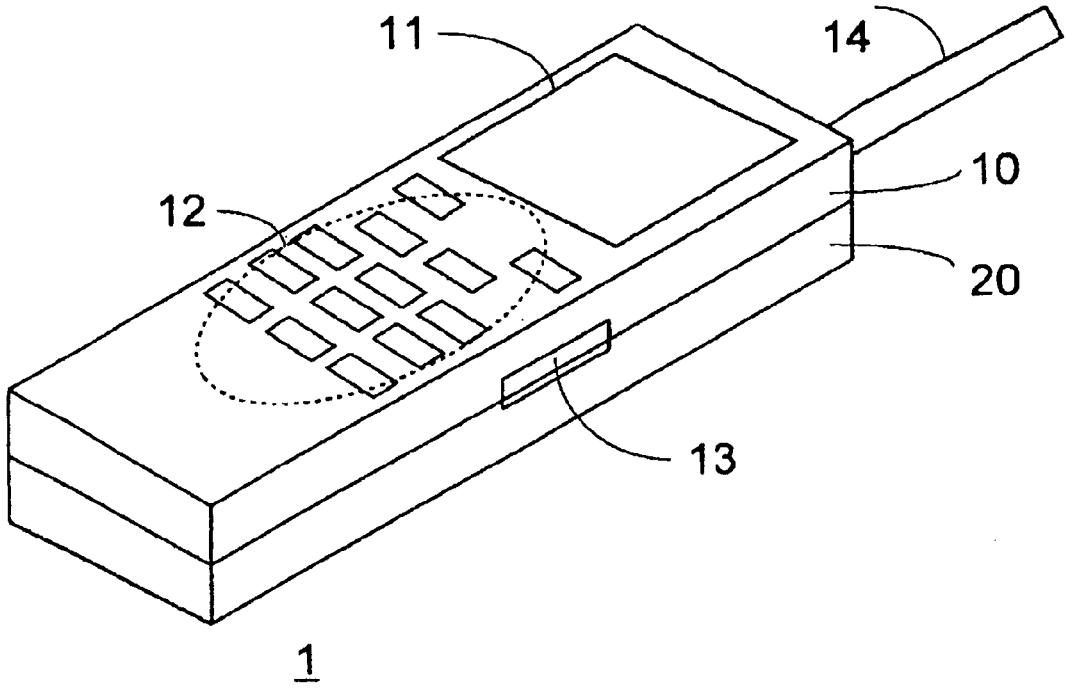
FIG. 1 presents one preferable embodiment of the multi-service mobile station according to the invention with its cover closed (mobile telephone position)
Figure 2:
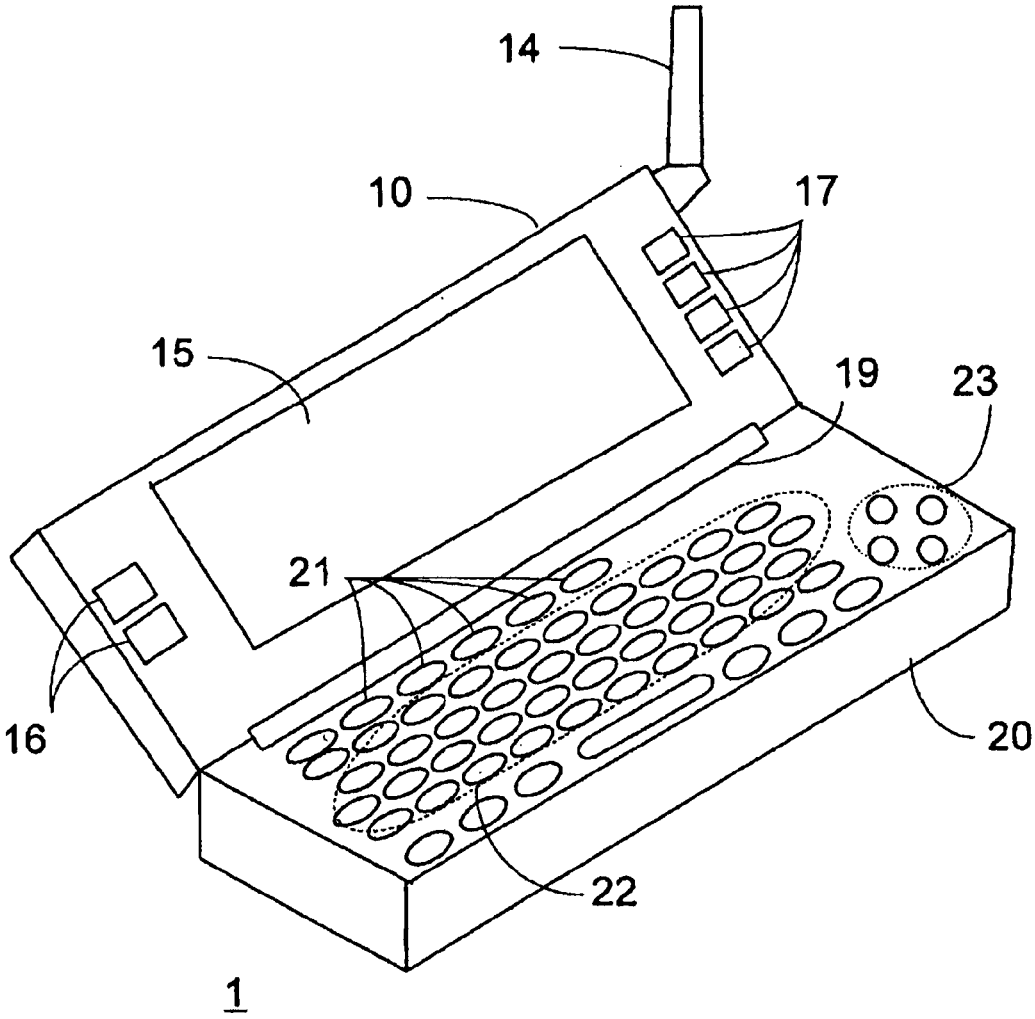
FIG. 2 presents one preferable embodiment of the multi-service mobile station according to the invention with its cover open (terminal mode position)

FIG. 1 presents one preferable embodiment of multi-service mobile station 1, in which it has two folding sections which can be folded/unfolded. Multi-service mobile station 1 is in FIG. 1 presented in mobile telephone position, in which top section 10 and base section 20 have been folded together, supported by hinge 19 (FIG. 2). The top side of cover section 10 comprises display 11 for displaying alphanumeric characters or graphics, and keyboard 12 for inputting alphanumeric characters in multi-service mobile station 1. When multi-service mobile station 1 is in its mobile telephone position, cover section 10 and base section 20 are locked together with latch 13. Antenna 14 is mounted in cover section 10 in the preferable embodiment according to the invention.

In FIG. 2 the same preferable embodiment of multi-service mobile station 1 is presented in its terminal (mode) position, with cover section 10 and base section 20 unfolded in a suitable angle, apart from each other, and supported by hinge 19. In this position the inside of cover section 10 and the top side of base section 20 provide the user a user interface comprising display 15, scroll keys 16 and function keys 17, and base section 20 provides application keys 21, QWERTY keys 22 and arrow keys 23, both prior known from typewriters and computers. If needed, displays 11, 15 can be equipped with a touch sensitive surface, making it possible to input information in multi-service mobile station 1 by touching display 11, 15 with a specific pen or with fingers.

Figure 3:
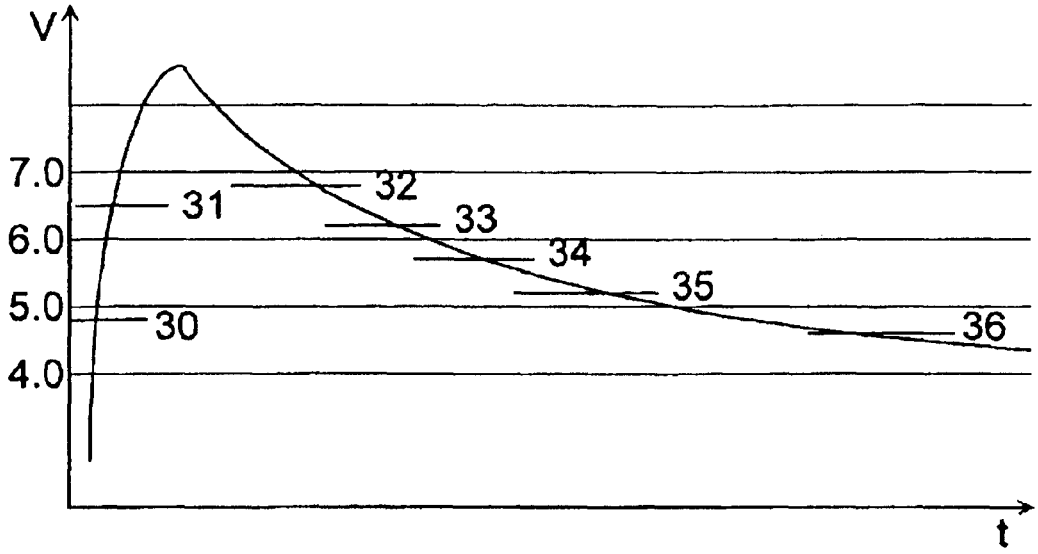
FIG. 3 presents limit values employed in automatic data storing and power saving automatics and FIG. 4 presents the connections between the processing means and applications in the multi-service mobile station.

FIG. 3 presents the behavior of battery voltage as a function of time, while charging or discharging a battery. FIG. 3 especially presents the limit voltages employed for the automatic saving function and the power saving automation. These limit value are PowerOn 30, RadioOK 31, 1Warn(ing) 32, 2Warn(ing) 33, Save 34, PowerOff 35 and Battery Protection 36.

Figure 4:
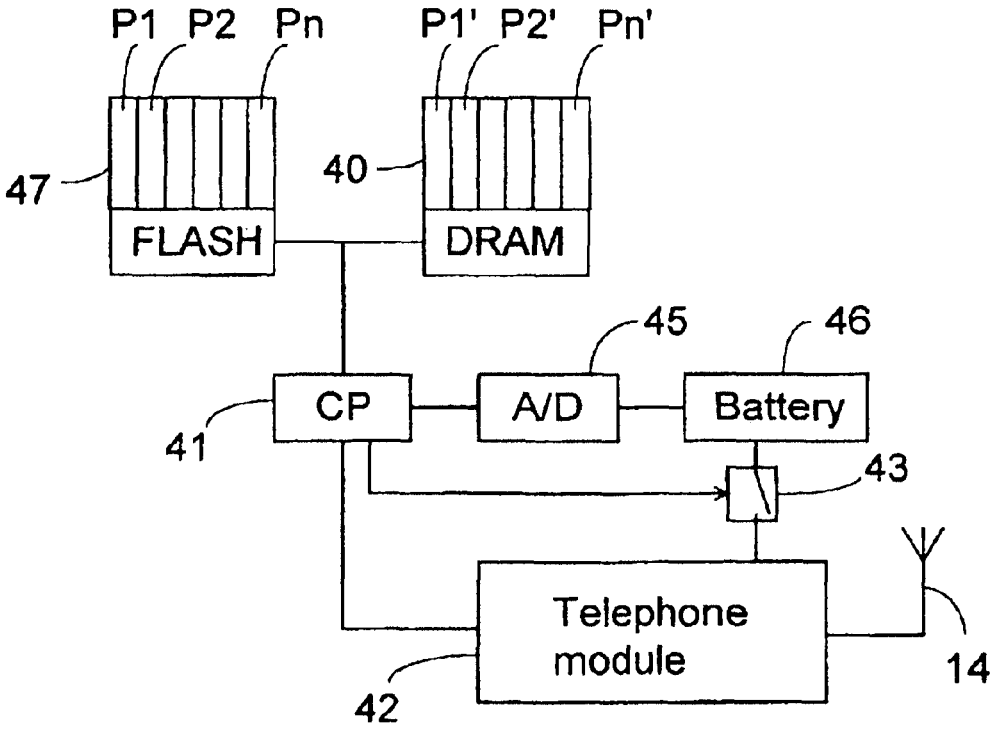

FIG. 4 presents the internal structure of the multi-service mobile station 1 according to the invention. It comprises memory 40, processor 41, telephone module 42, switch 43, A/D-converter 45, battery 46 and flash memory 47. Additionally, the figure presents the segments of memory space in the flash memory allocated for each service P1 to Pn, in which segments the program codes of the application program for each service P1 to Pn are stored. The description uses references P1 to Pn also when referring to program codes executing services P1 to Pn. Additionally, FIG. 4 presents in memory 40 the segments of memory space, in which the information P1' to Pn' processed by the user is stored. The information P1' to Pn' is characteristic of services P1 to Pn.

In mobile telephone position, that is when the cover section 10 and base section 20 are folded together as shown in FIG. 1, multi-service mobile station 1 operates in speech traffic like a traditional mobile telephone. Because now the parts of user interface used in terminal mode 15, 16, 17, 21, 22, 23 are protected by cover section 10 and base section 20, a user sees preferably only the simple users interface 11, 12 which makes it much easier to use the device as a normal mobile telephone.

For example, an incoming call is normally answered using keyboard 12. Differently from a conventional mobile telephone, in this preferable embodiment of multi-service mobile station 1, an incoming call can be answered, in addition to keyboard 12, also by opening multi-service mobile station 1 from mobile telephone position (FIG. 1) to terminal position (FIG. 2). If the incoming message is a call, speech service is activated automatically. If a telefax message or an electronic mail message is concerned, the corresponding service is activated automatically. The user can also, if wanted, disable the automatic answering at the opening of the cover section 10, e.g. by selecting a suitable disable function, using user interface 11, 12, 15, 16, 17.

If the user sets the multi-service mobile station 1 to automatic answering mode for telefax messages, short messages, such as the SMS (Short Message Service) messages familiar from GSM mobile telephones and electronic mail services, said messages are stored in the memory means 40, 47 of the multi-service mobile station 1. Simultaneously the user can e.g. block incoming calls. Incoming messages are indicated, if so wished, by an acoustic signal and/or in display 11, 15. Multi-service mobile station 1 can transmit messages which have been saved in advance, such as telefax messages, automatically at a predetermined time, even if multi-service mobile station 1 is in the mobile telephone position (FIG. 1). Receiving and transmitting messages and utilizing the data traffic services offered by the device is thus possible, even if multi-service mobile station 1 has been folded in the mobile telephone position.

If multi-service mobile station 1 is in the mobile telephone position and it is in speech mode, i.e. it is transmitting and receiving messages to/from the base station, the opening of multi-service mobile station 1 to mobile telephone position (FIG. 2) does not disturb the ongoing transmission or reception of messages. If a normal call is in process, it is possible to go over to use multi-service mobile station 1 in "hands free" mode. When the user moves the multi-service mobile station 1 from his ear on a table and opens it to terminal position according to FIG. 2, the built in microphone and loudspeaker (not shown in the figure) are activated. Because of the built in echo cancellation system, multi-service mobile station 1 can in speech service be used e.g. as a speaker phone, allowing several persons to participate in the discussion. The user can, if he wants, disable the automatic activation of said microphone and loudspeaker, e.g. by selecting an appropriate disable function from the menu of multi-service mobile station 1, when he wants to keep the call secrecy. In this case said microphone and/or loudspeaker are activated individually using an appropriate key 16, 17, 21. Simultaneously, while opening multi-service mobile station 1 to terminal position the microphone and loudspeaker, not shown in the figures, used in the mobile telephone position and located e.g. in the bottom surface of base section 20 of multi-service mobile station 1, are switched off.

When the user closes multi-service mobile station 1 to the mobile telephone position (FIG. 1) when a call is on, processor 41 of multi-service mobile station 1 stores the information, processed in the telecommunication services in memory 40 of multi-service mobile station 1. Depending on the service P1 to Pn used, the processed information P1' to Pn' is stored in the segment of memory space allocated to it. Depending on the program codes P1 to Pn of the services P1 to Pn used, which program codes are, as mentioned above, located in the memory segments allocated for them in flash memory 47, the information P1' to Pn' processed by the user, can be saved also in flash memory 47. When closing the multi-service mobile station 1, the microphone and loudspeaker, not shown in the figure, located for example in the base section 20 of multi-service mobile station 1, are activated, and multi-service mobile station 1 operates again like a conventional mobile station. When the user wishes to end a call, this is done either in the mobile telephone position using user interface 11, 12 or in the terminal position using user interface 15, 16, 17, 21, 22, 23.

In the multi-service mobile station 1 according to the invention, out of the means and functions of a portable computer, an electronic notebook and a mobile station, only those have been utilized which are necessary for the operation of multi-service mobile station 1. By effective integration of the above mentioned means and functions, components can preferably be omitted, e.g. a floppy disk drive and a hard disk, enabling the implementation of the multi-service mobile station 1 according to the invention in a very compact size. The fewer components and the smaller size also facilitate clearly lower manufacturing cost. The highly integrated construction, in which the same processing devices 40, 41, 42, 46, 47 are utilized for providing the mobile station functions as well as telecommunication services, results in an entity which is easier to control. The easiness of control enables employing automatic data storing methods, which are handy for the user and improve the safekeeping of information. The highly integrated construction also enables combining the automatic saving methods with effective power saving methods, resulting in distinctly longer operating and stand-by times.

Multi-service mobile station 1 offers, in addition to speech and data services known from traditional mobile telephones, such as SMS (Short Message Service), also several additional services P1 to Pn. Such services are e.g. the possibility to transmit and receive telefax and electronic mail messages, the possibility to contact Internet, the possibility to use multi-service mobile station 1 as an electronic notebook, or even to utilize the special services of the telecommunication network, such as call forwarding or group call services. Using the familiar WWW (World Wide Web) pages known from Internet environment, it is also possible to utilize new services still under development, such as weather forecast and betting services.

These above mentioned services P1 to Pn are utilized by the user in the preferable embodiment according to the invention mainly with multi-service mobile station 1 folded in the terminal position shown in FIG. 2. In order to have all services P1 to Pn offered by the multi-service mobile station 1 available immediately, without any delay, multi-service mobile station 1 remains preferably in stand by mode always when a sufficiently charged battery 46 is in place. This has been implemented so, that always when the voltage level of battery 46 exceeds a preset value, PowerOn 30 (FIG. 3), the processor 41 (FIG. 4) of multi-service mobile station 1 is activated and it starts the execution of the operating system in flash memory 40. This method, prior known to people skilled in the art, in which a program is executed directly in the memory in which it is stored, is called execution in place (XIP, Execute in place). This method saves DRAM memory 40 for other purposes.

The application programs P1 to Pn offering the various services P1 to Pn, can be executed in the flash memory of multi-service mobile station 1, alike the operating system (Execute In Place), but the processor may, based upon the information offered by application program P1 to Pn, load the required application programs P1 to Pn from flash memory 47 to memory 40, in which the desired application programs also can be executed. This is a preferable feature for example when high read and/or write speed is required by an application program P1 to Pn which offers a certain service P1 to Pn. In memory 40 the application programs P1 to Pn are available for processor 41 without delay, until the battery voltage drops below a preset limit PowerOff 35 (FIG. 3).

Flash memory 47 can be expanded according to a user's needs, and it facilitates updating of services P1 to Pn and adding new services even afterwards. Flash memory 47 can be expanded with an add-on module (not shown in the figure) which is connected to the PCMCIA bus.

When a user moves from a first service P1 to a second service P2, e.g. by pushing menu keys 21, processor 41 of the multi-service mobile station 1 saves the information from the display 15 of first service P1 and the user input P1' in memory 40 of multi-service mobile station 1. When the application program P1 so commands, which is preferable for securing the information, the user input is stored also in flash memory 47. In order to secure user information, it is possible, according to commands given by service P1 to Pn, to store information from memory 40 to flash memory 47 also according to other criteria. The information can be stored e.g. at five minute intervals, or the storing process can be connected to the power saving automation. When connected to the power saving automation, the same criteria can be used e.g. for switching off the display.

In multi-service mobile station 1 according to the invention, memory 40 is preferably of DRAM (Dynamic Random Access Memory) type. SRAM (Static Random Access Memory) used widely in PDA equipment is expensive and consumes plenty of electricity. Using DRAM memory, the operating time of multi-service mobile station 1 has been increased. Another significant advantage is that the information processed by multi-service mobile station 1 is immediately readable from the DRAM memory. In this way said first service P1 and the information related to it and in its display 15 are ready for use in memory means 40, 47 at once when the key assigned to said first service P1, e.g. menu key 21, is pressed next time. This makes it possible, among other things, that when momentarily going over from typing a telefax message to e.g. the SMS service, and returning to the telefax service, typing the telefax message can be continued from the same point, in which the user was before going over to the SMS service. The status information of each service, such as which file it was that was open and at Which point the user was editing said file, can for example be stored in the memory segment (P1' to Pn') allocated individually for each service. When each service is started, processor 41 of multi-service mobile station 1 reads the corresponding status data and initializes said status information of the service.

Said first service P1 and second service P2 utilize preferably same memory media 40, 47 making transferring information between different services easy and quick.

Said memory means 40, 47 and services P1 to Pn are arranged in such a way that the desired information can be transmitted as a telefax message, as a SMS message known from GSM systems, or as electronic mail through Internet by pressing just one key 15, 16, 17, 21, 22, 23. The required telefax, telephone or electronic mail addresses are retrieved automatically by multi-service mobile station 1 from its memory means 40, 47, if they have been stored there in advance. The user simply e.g. writes the required message using QWERTY keyboard 22, and after that just selects to whom and by which transfer method he sends the message. Respectively, the same message can easily be transmitted using several methods of transmission, e.g. as a SMS message to a mobile station and to a telefax in an office. If the address information is not found in the memory means, the user can input them individually for each transmission. The information to be transmitted is stored in memory means 40, 47, and when the user has selected the preferred transmission method, processor 41 of multi-service mobile station 1 executes the necessary processing operations, e.g. modifies text information to meet the requirements of telefax protocol. After this the required information is transferred by radio, utilizing the telephone module 42 of multi-service mobile station 1, utilizing the data channel provided by the module. The function of telephone module 42 is alike that of a familiar mobile station, e.g. a GSM mobile telephone, known to a person skilled in the art.

In order to be able to control effectively the power saving and data storing automation of multi-service mobile station 1, the processor 41 of multi-service mobile station 1 must know the charge status of battery 46. The charge status of the battery is examined e.g. by monitoring the voltage over battery 46 during charging and discharging battery 46. The voltage over battery 46 is measured employing analog/digital converter 45 connected to the poles of battery 46. A/D converter 45 forwards to processor 41 the voltage over battery 46 in digital form with sufficient accuracy, typically some tens of millivolts.

The charge status of battery 46 is examined employing several limits 30 to 36 (FIG. 3). If the voltage over well charged battery 46 drops below preset limit value 1Warning 32, the processor 41 of the multi-service mobile station 1 notifies the user of the weakening of the charge status of the battery through display 11, 15 or by an acoustic signal. If the voltage over battery 46 drops further below preset limit value 2Warning 33, multi-service mobile station 1 cuts off power supply to means 42, which are connected with transmission and reception of messages by radio. This is carried out by employing switch 43 controlled by processor 41. At the same time multi-service mobile station 1 outputs a second warning of the weakening battery charge status, and notifies that services requiring transferring messages by radio cannot be used until the battery has been recharged.

When the battery charge status further becomes weaker, or sufficient current supply is prevented for some other reason, so that voltage over the battery drops below preset limit value Store 34, the processor 41 of multi-service mobile station 1 stores the information processed by all services in such memory means 47 of multi-service mobile station 1, which are suitable for long time data storing and need no current. In this way no information is lost. When flash memory 47 is used, care must be taken, in order to secure the information storing, that the amount of unsaved data does not exceed the limit value characteristic of flash memory, typically approximately 1 kbyte, which is the largest amount of data when the fast storing method characteristic of flash memory is used. This requirement is easy to meet in application programs P1 to Pn, which are, due to their program being capable of measuring e.g. the amount of data, input by the user using QWERTY keyboard or the amount of data contained in an incoming telefax message.

If the voltage over battery 46 drops further below preset limit value PowerOff 35, multi-service mobile station 1 cuts off power from even the section of multi-service mobile station 1 offering data traffic services and remains waiting for battery change or recharging. As a last precaution, battery 46 itself measures its own voltage and cuts off the voltage from its terminals when the battery cell voltage drops below preset limit value BatteryProtection 36. The cutting off is executed by a built in switch (not shown in the figure) in battery 46. When the voltage over the battery next time exceeds preset limit value PowerOn 30, multi-service mobile station 1 is reactivated and services P1 to Pn are ready for use again.

In order to maximize the stand by and operation times, particular attention has been given to developing the power saving methods. In multi-service mobile station 1 such a power saving automation is employed, which is based upon a close-knit cooperation between hardware and operating system. In regard to its functions, multi-service mobile station 1 can be divided into two modules, telephone module 42 and service module. Telephone module 42 comprises means for connecting the multi-service mobile station 1 by radio to the telecommunication network. In addition to that, display 11 and keyboard 12 belong to the telephone module. The service module comprises means for offering communication services, such as display 15, and keyboards 16, 17, 21, 22, 23. Both said modules employ partly or entirely same means of processing 40, 41, 46, 47.

As stated above, the operating voltage is always on in the service module of multi-service mobile station 1, provided that the battery voltage exceeds preset limit value PowerOn 30. Correspondingly, the telephone module can be used for transmission and reception of messages if the battery voltage exceeds preset limit value RadioOK 31. Because the level of RadioOK 31 is higher than PowerOn 30, the service module is always active if messages are transferred by radio. This makes it possible for processor 41 of the service module to control also the operation of the power saving automation of the telephone module. If the service module wants to transfer messages by radio, the processor 41 of the service module activates telephone module 42 in order to assist in executing the service. Preferably, the RF module (not shown in the figure), which is comprised in telephone module 42 and consumes plenty of energy, is activated individually only when it is required because of transmission or reception of a message. Correspondingly, power supply to the RF module is cut off immediately when possible with regard to offering the service.

If the user is not using multi-service mobile station 1 when the first preset, typically time related criterium is met, the processor 41 of multi-service mobile station 1 shifts multi-service mobile station 1 to the first stage of power saving, when the clock signals of the processing media 41 are stopped in order to save current. Multi-service mobile station 1 is reactivated if the user touches any of keys 12, 16, 17, 21, 22, 23, folds it to the mobile telephone position shown in FIG. 1 or unfolds it to the terminal position shown in FIG. 2. If the user is not using multi-service mobile station 1 even when the second preset criterium is met, the processor 41 of multi-service mobile station 1 save the information contained in the services P1 to Pn being used from memory 40 to memory means suitable for long time saving, e.g. flash memory 47, which needs no power for storage of information. After this, processor 41 of multi-service mobile station 1 sets the system in deep power saving mode. Because all information processed in services P1 to Pn is stored in memory means 47, there is no more any need to store the information in the DRAM based memory means, and the power consuming refresh signal of the DRAM memory circuits can preferably be switched off. Because all information processed is now stored in flash memory 47, there is no need to monitor the voltage over battery 46, because even if the voltage over battery 46 would drop further or even if battery 46 would be entirely removed, the information processed has been saved. This reduces power consumption for its share.

Multi-service mobile station 1 according to the invention is equipped with an infrared transmitter/receiver unit, which makes it possible for the multi-service mobile station 1 to communicate with external equipment. This enables using the multi-service mobile station 1 e.g. instead of a credit card or other payment card in payment applications for example in shops and gas stations. The infrared transmitter/receiver unit enables using the multi-service mobile station 1 also as a remote control device, as a key or as a means of identification in security applications, or as an interface to a wireless WLAN network (Wireless Local Area Network). A very convenient feature is also the data transfer between multi-service mobile station 1 and a computer, and for example printing out received telefax messages using a printer connected to a network. These services may be integrated into multi-service mobile station 1, or they can be added to multi-service mobile station 1 using separate add-on modules.

Because, additionally, the multi-service mobile station 1 according to the invention has the data traffic interfaces of the future and enhancements possibilities are well catered for, the present and the future services can preferably be utilized effectively using multi-service mobile station 1.

We have here presented the execution and some embodiments of the invention utilizing examples. It is obvious to a person skilled in the art that the invention is not limited to the details in the above presented embodiments and that the invention can be executed even in another embodiment without deviating from the characteristics of the invention. The above presented embodiments should be regarded as enlightening but not limiting. Thus the possibilities of executing and using the invention are limited only by the enclosed claims. Accordingly, the various embodiments of the invention specified in the claims, equivalent embodiments included, are covered by the invention.

What is claimed is:

1. A multi-service mobile station comprising:

a housing having at least first and second sections, said sections being connected by means which allow said sections to be moved in relation to each other between a first position and a second position;

a processor for processing information in an information processing service;

a radio receiver for receiving information for use of the information processing service;

a volatile memory for receiving the information from the radio receiver;

a user interface for receiving user input;

wherein the processor is configured to process the information in the information processing service according to the user input; and a non-volatile memory;

wherein the processor has been configured to automatically store the information processed by the processor from the volatile memory into the non-volatile memory, in response to movement of said sections to and from said first and second positions.

2. A multi-service mobile station, according to claim 1, wherein in said first position said first section is moved over said second section, and wherein in said second position said sections extend away from each other and, said mobile station further comprises:

a user interface for a mobile telephone mounted in said first section, said mobile telephone user interface being accessible to the user when said sections are in said first position;

a multi-service user interface mounted in said second section, said multi-service interface being covered by said first section in said first position and being accessible to said user when said sections are in the second position.

3. A multi-service mobile station, according to claim 2, wherein said mobile phone user interface is activated and said multi-user interface is turned off in said first position and wherein said mobile phone user interface is turned off and said multi-user interface is activated in said second position.

4. A multi-service mobile station, according to claim 2, wherein said multi-service user interface provides means to select a service from at least a first service and a second service and said processor is programmed to start the last active service and to restore status information related to said last active and the latest information from said non-volatile memory to a display of said multi-service user interface, when said first section and said second section are in said second position.

5. A multi-service mobile station according to claim 2, wherein said mobile phone interface comprises a microphone and a loudspeaker for using the multi-service mobile station like a mobile station, and said multi-service user interface comprises a microphone and a loudspeaker for using the multi-service mobile station like a hands-free telephone.

6. A multi-service mobile station, according to claim 2, wherein said processor is programmed to start the last active service and to restore status information related to said last active service and the latest information from said non-volatile memory to a display of said second user interface, when said first section and said second section are in said second position.

7. A multi-service mobile station, according to claim 1, wherein said first section has a first user interface and second s section has a second user interface, and said mobile station is constructed to turn off one user interface and activate the other user interface and visa-versa, when said sections are moved to and from said first and second positions.

8. A multi-service mobile communication station comprising:

a housing having at least first and second sections, said sections being connected by means which allow said sections to be moved in relation to each other between a first position and a second position;

means for connecting said mobile station by radio to a telecommunication network for using information processing services, which include at least a first information processing service and a second information processing service; and a volatile memory for holding information;

a first user interface contained in said first section for allowing a user to operate said mobile communication station as a mobile telephone wherein said first user interface is accessible to the user in said first position;

a second user interface for selecting an information processing service from at least said first service and said second service, for generating at least one command, and for allowing the user to edit information held in the volatile memory in the information processing service selected, said second user interface being accessible to the user in the second position;

processing means for processing information related to the service selected, in accordance with the information processing service selected, and for processing information according to said at least one command and the user's editing, automatic storing means comprising a non-volatile memory for automatically storing in the non-volatile memory both information related to the service selected and the information edited by the user in response to meeting a predetermined criterion.

9. A multi-service mobile communication station, according to claim 8, wherein said predetermined criterion comprises changing between said first and second services.

10. A multi-service mobile communication station, according to claim 8, wherein said predetermined criterion comprises moving said sections from said first position to said second position.

*11. The multi-service mobile station as in claim 1, wherein the first position comprises the first and second sections being folded together and the second position comprises the first and second sections being unfolded relative to each other, wherein the multi-service mobile station further comprises a first display on an exterior side of the first section and a second display on the housing, wherein the second display is covered by the housing when the first and second sections are in the first position, and wherein the second display is uncovered when the first and second sections are in the second position.*

*12. A mobile communication station comprising:*

*a housing having a first section and a second section, wherein the first and second sections are connected to allow the sections to be moved in relation to each other between a first position and a second position;*

*a processor in the housing;*

*a radio receiver in the housing;*

*a volatile memory in the housing for receiving the information from the radio receiver;*

*a user interface on the housing for receiving user input, wherein the processor is configured to process the information at least partially according to the user input; and*

*a non-volatile memory;*

*wherein the processor is configured to automatically store the information processed by the processor from the volatile memory into the non-volatile memory in response to movement of the housing between the second position and the first position.*

*13. A mobile communication station as in claim 12 wherein the processor is configured to automatically store the information processed by the processor from the volatile memory into the non-volatile memory in response to movement of the housing between the first position and the second position.*

*14. A mobile communication station comprising:*

*a housing comprising a first section movably connected to a second section between a first collapsed position and a second expanded position;*

*a first display on the first section, wherein the first display is viewable by a user when the first and second sections are in the first collapsed position;*

*a second display on the housing which is located between the first and second sections when the first and second sections are in the first position, and wherein the second display is viewable by a user when the first and second sections are in the second expanded position; and*

*electronic circuitry inside the housing and operably connected to the displays, wherein the electronic circuitry comprises an antenna, a radio frequency receiver, at least one memory, and a processor, and wherein the processor is adapted to store information in the at least one memory in response to movement of the housing between the first and second positions.*

*15. A mobile communication station as in claim 14 wherein the mobile communication station comprises a telephone.*

*16. A mobile communication station as in claim 14 wherein the first display is located on a top side of the first section, and the mobile communication station further comprises alphanumeric keys on the top side of the first section.*

*17. A mobile communication station as in claim 16 wherein the second display is located on an opposite side of the first section.*

*18. A mobile communication station as in claim 16 wherein the second section comprises keys on a top side of the second section which are located opposite the second display when the housing is in the first collapsed position.*

*19. A mobile communication station as in claim 14 wherein the second display is not viewable by a user when the first and second sections are in the first collapsed position.*

*20. A mobile communication station as in claim 14 wherein the at least one memory comprises a first memory and a second memory, and wherein the predetermined operation comprises the processor automatically storing information processed by the processor from the first memory into the second memory in response to movement of the housing between the first and second positions.*

*21. A mobile communication station as in claim 20 wherein the first memory is a volatile memory and the second memory is a non-volatile memory.*

*22. A mobile communication device comprising:*

*a housing comprising a first section rotatably connected to a second section between a first folded position and a second different position, wherein the first folded position comprises the first section being located over a top side of the second section, and wherein the second different position comprises at least a portion of the first section being rotated away from the top side of the second section;*

*a first display at a top side of the first section;*

*a second display on the housing which is covered when the first and second sections are in the first folded position and which is uncovered when the first and second sections are in the second different position; and*

*electronic circuitry in the housing operably coupled to the first and second displays, wherein the electronic circuitry comprises a radio frequency receiver, a processor, a first memory and a second memory, and wherein the processor is configured to automatically store information processed by the processor from the first memory into the second memory in response to movement of the housing between the first and second positions.*

*23. A mobile communication device as in claim 22 wherein the mobile communication device comprises a telephone.*

*24. A mobile communication device as in claim 22 further comprising alphanumeric keys on the top side of the first section.*

*25. A mobile communication device as in claim 22 wherein the second display is located on an opposite side of the first section.*

*26. A mobile communication device as in claim 25 wherein the second section comprises keys on a top side of the second section which are located opposite the second display when the housing is in the first folded position.*

*27. A mobile communication device as in claim 22 wherein the second display is not viewable by a user when the first and second sections are in the first folded position.*

*28. A mobile communication device as in claim 22 wherein the first memory is a volatile memory and the second memory is a non-volatile memory.*

*29. A mobile communication station comprising:*

*a housing comprising a first section movably connected to a second section between a first position and a different second position;*

*a first display on the first section, wherein the first display is viewable by a user when the first and second sections are in the first position;*

*a second display on the first section, wherein the second display is viewable by a user when the first and second sections are in the second position, and is not viewable when the first and second sections are in the first position;*

*a key on the first section adjacent the second display, wherein the key is accessible for actuation by a user when the first and second sections are in the second position, and is not accessible for actuation by the user when the first and second sections are in the first position; and*

*electronic circuitry inside the housing and operably connected to the displays, wherein the electronic circuitry comprises an antenna, a radio frequency receiver, and at least one memory and a processor, and wherein the processor is adapted to store information in the at least one memory in response to movement of the housing between the first and second positions.*

* * * * *